United States Patent
Backer et al.

(10) Patent No.: US 10,392,503 B2
(45) Date of Patent: Aug. 27, 2019

(54) POLYMER BLEND IN GRANULAR FORM AND PROCESS FOR MAKING SAME

(71) Applicants: Union Carbide Chemicals & Plastics Technology LLC, Midland, MI (US); Rohm and Haas Company, Collegeville, PA (US)

(72) Inventors: Scott Backer, Phoenixville, PA (US); Eric P. Wasserman, Hopewell, NJ (US); Severine Ferrieux, Grasse (FR)

(73) Assignees: Rohm and Haas Company, Philadelphia, PA (US); Union Carbide Chemicals & Plastics Technology LLC, Midland, MI (US)

( * ) Notice: Subject to any disclaimer, the term of this patent is extended or adjusted under 35 U.S.C. 154(b) by 0 days.

(21) Appl. No.: 15/557,839

(22) PCT Filed: Jun. 7, 2016

(86) PCT No.: PCT/US2016/036191
§ 371 (c)(1),
(2) Date: Sep. 13, 2017

(87) PCT Pub. No.: WO2016/205015
PCT Pub. Date: Dec. 22, 2016

(65) Prior Publication Data
US 2018/0291193 A1 Oct. 11, 2018

(30) Foreign Application Priority Data
Jun. 15, 2015 (EP) .................................... 15290159

(51) Int. Cl.
*C11D 1/00* (2006.01)
*C11D 3/37* (2006.01)
(Continued)

(52) U.S. Cl.
CPC ............ *C08L 33/26* (2013.01); *C08F 220/06* (2013.01); *C08J 3/005* (2013.01); *C08L 33/02* (2013.01);
(Continued)

(58) Field of Classification Search
CPC ........... C11D 1/00; C11D 3/37; C11D 3/3761; C08L 33/02; C08L 33/10; C08J 3/00; C08J 3/12
See application file for complete search history.

(56) References Cited

U.S. PATENT DOCUMENTS

| 6,133,345 | A | 10/2000 | Pakusch et al. |
| 7,655,710 | B2 | 2/2010 | Hommer et al. |
| 2004/0121934 | A1 | 6/2004 | Dougherty |

FOREIGN PATENT DOCUMENTS

| CA | 1202852 | 4/1986 | |
| EP | 1935852 | * 6/2008 | ................ C02F 5/10 |
| EP | 2657292 | 10/2013 | |

* cited by examiner

*Primary Examiner* — Brian P Mruk
(74) *Attorney, Agent, or Firm* — Thomas S. Deibert

(57) ABSTRACT

Provided is a polymer blend in granular form and a process for making the blend. The blend is suitable for use as an additive in a variety of applications, such as in detergent formulations. The blend comprises: (i) one or more first polymers each independently having a weight-average molecular weight of 35,000 to 100,000 g/mol and each independently comprising polymerized units of (a) 22 to 80 wt % of one or more monoethylenically unsaturated C3-C6 carboxylic acid monomers, and (b) 20 to 78 wt % of one or more C1-C12 alkyl (meth)acrylate monomers; and (ii) one or more second polymers each independently having a weight-average molecular weight of 1,000 to 45,000 g/mol and each independently comprising polymerized units of 50 to 100 wt % of one or more monoethylenically unsaturated C3-C6 carboxylic acid monomers, wherein component (i)

(Continued)

comprises from 1 wt % to 50 wt % based on the total weight of (i) and (ii), wherein the polymer blend is in granular form, and wherein one or more polymers of the polymer blend is at least partially neutralized.

7 Claims, 2 Drawing Sheets

(51) Int. Cl.
*C08L 33/02* (2006.01)
*C08L 33/10* (2006.01)
*C08J 3/00* (2006.01)
*C08J 3/12* (2006.01)
*C08L 33/26* (2006.01)
*C08F 220/06* (2006.01)

(52) U.S. Cl.
CPC ......... *C11D 3/3757* (2013.01); *C08J 2333/02* (2013.01); *C08J 2433/08* (2013.01); *C08L 2205/025* (2013.01); *C08L 2205/035* (2013.01)

POLYMER BLEND IN GRANULAR FORM AND PROCESS FOR MAKING SAME

FIELD

This invention relates generally to a polymer blend in granular form and to a process for making the polymer blend. The blend is suitable for use as an additive in a variety of applications, such as in detergent formulations.

BACKGROUND

Granulated polymers are widely used in formulations where large quantities of water are undesirable, e.g., fabric washing powder, dishwashing powder, dishwashing tablets, water softening powder/tablets and wettable powders containing active ingredients. The polymers may be included in such formulations as, for instance, dispersants.

It is often desirable for granulated polymers to be formed from blends of two or more polymers, thereby allowing the formulator to exploit favorable properties of the constituent polymers. It is also desirable for the blend of polymers to form a single granule, (and not a mixture of granules of each individual polymer) that exhibits compositional homogeneity, high bulk density, low water content, and favorable particle size.

Formulating polymer blends into uniform granules is challenging, however, particularly where the mixed polymers in solution/dispersion are otherwise incompatible, and are therefore not amenable to the formation of homogenous solids.

Processes that provide granules that are blends of polymers and that exhibit compositional homogeneity, high bulk density, low water content, and/or favorable particle size, and the blends prepared thereby, are desirable in the art.

STATEMENT OF INVENTION

We have now found that blends of acrylate based polymers that may otherwise not be stable when mixed in aqueous form can nevertheless be favorably mixed into a dry granular blend according to the processes described here. Advantageously, the polymer blends of the invention exhibit several favorable properties, including compositional homogeneity. The blends, therefore, may be readily used in a variety of applications including, for instance, in the manufacture of detergents, such as those in tablet, powder, monodose unit, multi-component monodose unit, or sachet form.

Accordingly, in one aspect, the invention provides a polymer blend comprising:
(i) one or more first polymers each independently having a weight-average molecular weight of 35,000 to 100,000 g/mol and each independently comprising polymerized units of
  (a) 22 to 80 wt % of one or more monoethylenically unsaturated C3-C6 carboxylic acid monomers, and
  (b) 20 to 78 wt % of one or more C1-C12 alkyl (meth)acrylate monomers; and
(ii) one or more second polymers each independently having a weight-average molecular weight of 1,000 to 45,000 g/mol and each independently comprising polymerized units of 50 to 100 wt % of one or more monoethylenically unsaturated C3-C6 carboxylic acid monomers, wherein component (i) comprises from 1 wt % to 50 wt % based on the total weight of (i) and (ii), wherein the polymer blend is in granular form, and wherein one or more polymers of the polymer blend is at least partially neutralized.

In another aspect, the invention provides a polymer blend as described above that is made by a process comprising:
(a) providing an aqueous solution of the one or more first polymers at pH 5 to 9;
(b) providing an aqueous solution of the one or more second polymers at pH 5 to 12;
(c) mixing together the solution of step (a) and the solution of step (b); and
(d) drying the mixture prior to gross phase separation of the mixture.

In a further aspect, there is provided a process for making a polymer blend, the process comprising the steps as described herein.

In a yet further aspect, there is provided a detergent composition (such as a laundry or dishwashing detergent composition) comprising a builder, a surfactant, and a polymer blend as described herein.

DETAILED DESCRIPTION

Figure 1:
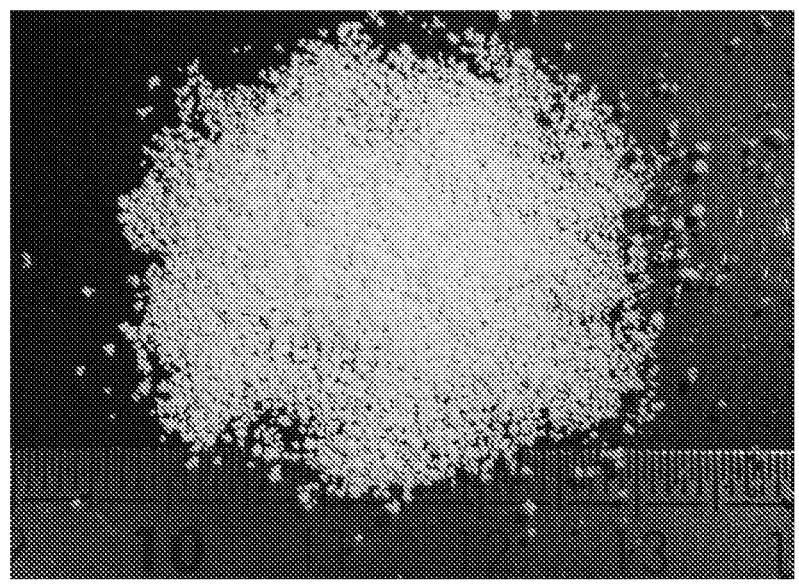
FIGS. 1-4 are optical microscope images of polymer blend granules prepared according to the invention.

Unless otherwise indicated, numeric ranges, for instance as in "from 2 to 10" or "between 2 and 10," are inclusive of the numbers defining the range (e.g., 2 and 10). Unless otherwise indicated, ratios, percentages, parts, and the like are by weight. As used herein, unless otherwise indicated, the phrase "molecular weight" or Mw refers to the weight average molecular weight as measured in a conventional manner with gel permeation chromatography (GPC) and polyacrylic acid standards. GPC techniques are discussed in detail in Modern Size Exclusion Chromatography, W. W. Yau, J. J. Kirkland, D. D. Bly; Wiley-lnterscience, 1979, and in A Guide to Materials Characterization and Chemical Analysis, J. P. Sibilia; VCH, 1988, p. 81-84. Molecular weights are reported herein in units of Daltons or g/mol. For the purposes of this document, polymers of weight average molecular weight at 1,000 or above and below 8,000 g/mol are considered low molecular weight, while polymers of weight average molecular weight from 8,000 and up to 45,000 g/mol are considered moderate molecular weight. The term "ethylenically unsaturated" is used to describe a molecule or moiety having one or more carbon-carbon double bonds, which renders it polymerizable. The term "ethylenically unsaturated" includes monoethylenically unsaturated (having one carbon-carbon double bond) and multi-ethylenically unsaturated (having two or more carbon-carbon double bonds). As used herein the term "(meth) acrylic" refers to acrylic or methacrylic. The term "(meth) acrylate" refers to acrylate or methacrylate. Weight percentages (or wt %) in the composition are percentages of dry weight, i.e., excluding any water that may be present in the composition. Percentages of monomer units in the polymer are percentages of solids weight, i.e., excluding any water present in a polymer emulsion. Unless otherwise indicated, percentages of polymerized units of monomers in a polymer are by weight based on the total weight of the polymer. The term "solution" encompasses mixtures in which the polymer(s) is fully or partially dissolved in the solvent, and includes dispersions, as well as mixtures that are hazy when observed with the naked eye.

"Alkyl," as used in this specification encompasses straight and branched chain aliphatic groups having the indicated number of carbon atoms. If no number is indicated, then 1-6 alkyl carbons are contemplated. Preferred alkyl groups include, without limitation, methyl, ethyl, propyl, isopropyl, butyl, isobutyl, sec-butyl, tert-butyl, pentyl, and hexyl.

As indicated above, in one aspect, the invention provides a polymer blend comprising:
(i) one or more first polymers each independently having a weight-average molecular weight of 35,000 to 100,000 g/mol and each independently comprising polymerized units of
   (a) 22 to 80 wt % of one or more monoethylenically unsaturated C3-C6 carboxylic acid monomers, and
   (b) 20 to 78 wt % of one or more C1-C12 alkyl (meth)acrylate monomers; and
(ii) one or more second polymers each independently having a weight-average molecular weight of 1,000 to 45,000 g/mol and each independently comprising polymerized units of 50 to 100 wt % of one or more monoethylenically unsaturated C3-C6 carboxylic acid monomers,
wherein component (i) comprises from 1 wt % to 50 wt % based on the total weight of (i) and (ii), wherein the polymer blend is in granular form, and wherein one or more polymers of the polymer blend is at least partially neutralized.

The first polymer of the polymer blend may be present as a single polymer or as a mixture of polymers, each independently having the defined structure. Where the following description refers to a "first polymer," it is to be understood that such description applies independently to each of the polymers (if more than one is present) that together constitute the "one or more first polymers."

The first polymer comprises polymerized units of 22 to 80 wt % of monoethylenically unsaturated C3-C6 carboxylic acid monomers, and 20 to 78 wt % of C1-C12 alkyl (meth)acrylate monomers, each based on a total weight of the first polymer. In an embodiment, the first polymer is an acrylic polymer, for instance one having at least 22 wt % polymerized units of the monoethylenically unsaturated C3-C6 carboxylic acid units, based on a total weight of the first polymer. The first polymer may comprise 10 to 80 wt %, alternatively 15 to 75 wt %, alternatively 20 to 70 wt % of methacrylic acid units; 0 to 30 wt %, alternatively 5 to 25 wt %, alternatively 10 to 20 wt % of acrylic acid units; and 20 to 70 wt %, alternatively 25 to 65 wt %, alternatively 30 to 60 wt % of C1-C12 alkyl (meth)acrylate units, each based on a total weight of the first polymer.

In an embodiment, the first polymer may comprise 10 to 34 wt %, alternatively 12 to 32 wt %, alternatively 14 to 30 wt % of methacrylic acid units; 10 to 20 wt %, alternatively 12 to 18 wt %, alternatively 14 to 16 wt % of acrylic acid units; and 46 to 70 wt %, alternatively 44 to 68 wt %, alternatively 42 to 66 wt % of C1-C12 alkyl (meth)acrylate units, each based on a total weight of the first polymer.

In another embodiment, the first polymer may comprise 55 to 80 wt %, alternatively 58 to 74 wt %, alternatively 61 to 71 wt % of methacrylic acid units; and 25 to 50 wt %, alternatively 28 to 45 wt %, alternatively 31 to 40 wt % of the C1-C12 alkyl (meth)acrylate units, each based on a total weight of the first polymer. Of the of the C1-C12 alkyl (meth)acrylate units, the first polymer may comprise 10 to 35 wt %, alternatively 12 to 30 wt %, alternatively 14 to 25 wt % of ethyl acrylate units; and 10 to 35 wt %, alternatively 12 to 30 wt %, alternatively 14 to 25 wt % of butyl acrylate units, each based on a total weight of the first polymer.

In some embodiments, the first polymer may comprise at least 25 wt %, alternatively at least 30 wt %, alternatively at least 35 wt % polymerized units of a C1-C12 alkyl (meth) acrylate, based on a total weight of the first polymer. In an embodiment the first polymer comprises no more than 80 wt % of polymerized units of the C1-C12 alkyl (meth)acrylate, alternatively 30 to 75 wt %, alternatively 30 to 70 wt %, based on a total weight of the first polymer. In an embodiment, the C1-C12 alkyl (meth)acrylate units are C2-C4 alkyl (meth)acrylate units, alternatively ethyl acrylate (EA) and/or butyl acrylate (BA) units. In an embodiment, the first polymer contains no more than 15 wt % of polymerized units of (meth)acrylate esters that are not C1-C12 alkyl (meth)acrylates, alternatively no more than 10 wt %, alternatively no more than 7 wt %, or no more than 4 wt % of polymerized units of (meth)acrylate esters. Of the C1-C12 alkyl (meth)acrylate, the methyl acrylate (MA), EA, and BA units may each independently be present in amounts of 0 to 100 wt %, alternatively 10 to 90 wt %, alternatively 20 to 80 wt %, or 30 to 70 wt %, or 40 to 60 wt %. In an embodiment, the first polymer comprises 45 to 70 wt % of the C1-C12 alkyl (meth)acrylate units, alternatively 50 to 65 wt %, alternatively 55 to 60 wt %, based on a total weight of the first polymer. The monoethylenically unsaturated C3-C6 carboxylic acid units of the first polymer may be methacrylic acid units, acrylic acid units, or a combination thereof.

In another embodiment, the first polymer may comprise 25 to 45 wt % of the C1-C12 alkyl (meth)acrylate units, alternatively 30 to 40 wt %, alternatively 32 to 38 wt %, based on a total weight of the first polymer. An embodiment in which ethyl acrylate units are present in an amount of 12 to 25 wt %, alternatively 15 to 20 wt %, and butyl acrylate units are present in an amount of 12 to 25 wt %, alternatively 15 to 20 wt %, based on a total weight of the first polymer, is specifically mentioned.

In these embodiments, the first polymer has a weight average molecular weight (Mw) in the range from 35,000 to 100,000 g/mol, alternatively from 40,000 to 90,000 g/mol, alternatively from 40,000 to 70,000 g/mol.

In some embodiments, the first polymer further comprises one or more ethylenically unsaturated monomers such as esters of carboxylic acid anhydrides, imides, amides, styrenes, sulfonic acids, or a combination thereof. In some embodiments, this monomer is present in 1-30 wt % of the polymer. Sulfonic acid monomers include, for example, 2-(meth)acrylamido-2-methylpropanesulfonic acid, 4-styrenesulfonic acid, vinylsulfonic acid, 2-sulfoethyl(meth) acrylic acid, 2-sulfopropyl(meth)acrylic acid, 3-sulfopropyl (meth)acrylic acid, and 4-sulfobutyl(meth)acrylic acid and salts thereof. Further examples of ethylenically unsaturated monomers include, without limitation, maleic anhydride, vinyl acetic acid, acryloxypropionic acid, methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butyl acrylamide, N-methyl acrylamide, N,N-dimethyl acrylamide; acrylonitrile, methacryionitrile, allyl alcohol, allyl sulfonic acid, allyl phosphonic acid, vinylphosphonic acid, dimethylaminoethyl acrylate, dimethylaminoethyl methacrylate, phosphoethyl methacrylate, phosphonoethyl methacrylate (PEM), and sulfonoethyl methacrylate (SEM), N-vinyl pyrollidone, N-vinylformamide, N-vinylimidazole, ethylene glycol diacrylate, trimethylotpropane triacrylate, diallyl phthalate, vinyl acetate, styrene, divinyl benzene, allyl acrylate, 2-acrylamido-2-methyl propane sulfonic acid (AMPS) or its salts or a combination thereof.

The first polymer may be made by free-radical polymerization, e.g., free-radical emulsion polymerization in the presence of a C2-C24 alkanethiol. In a preferred embodiment, the first polymer is prepared by the free-radical emulsion polymerization technique, in which an agitated mixture of the ethylenically-unsaturated monomers, water, and a surfactant is reacted by the action of free-radicals generated by the decomposition of precursors such as alkali persulfates, azo compounds, or organic peracids, or peresters. The activation of these precursors may be by the action of elevated reaction temperature alone (thermal activation) or by the admixture of redox-active agents such as a combination of iron(II) sulfate and ascorbic acid (redox activation). In these cases, a chain-transfer agent is typically used to modulate polymer molecular weight. One class of preferred chain-transfer agents employed in emulsion polymerizations is the mercaptans (alkanethiols). Specifically mentioned are linear alkanethiols such as n-dodecyl mercaptan (n-dodecanethiol). A minor amount of the chain transfer agent, such as n-dodecyl mercaptan, may be incorporated in the polymer, for instance up to 2 wt % based on the total weight of the polymer.

One or more of the monomers from which the first polymer is comprised may be in free acid form, or they may be present in neutralized (salt) form.

The second polymer of the polymer blend may be present as a single polymer or as a mixture of polymers, each independently having the defined structure. Where the following description refers to a "second polymer," it is to be understood that such description applies independently to each of the polymers (if more than one is present) that together constitute the "one or more second polymers."

In some embodiments, the second polymer is a homo- or copolymer containing at least 50 wt %, alternatively 50 to 100 wt %, alternatively 60 to 95 wt % of monoethylenically unsaturated C3-C6 carboxylic acid units, such as (meth) acrylic acid units. The weight-average molecular weights of these polymers are between 1,000 and 45,000 g/mol, preferably between 1,000 and 40,000 g/mol, and most preferably between 2,000 and 35,000 g/mol. Monomers units which may be used in conjunction with monoethylenically unsaturated C3-C6 carboxylic acids include ethylenically-unsaturated dicarboxylic acids (such as maleic acid and itaconic acid), sulfonic acid monomers or their salts (such as 2-acrylamido-2-methyl propane sulfonic acid or 2-acrylamido-2-methylpropanesulfonic acid sodium salt), acrylamide, N-alkyl acrylamides, and monomers containing (meth) acrylic esters of polyethylene glycol monoalkyl ethers.

In some embodiments, the second polymer is a homopolymer comprising polymerized units of a monoethylenically unsaturated C3-C6 carboxylic acid monomer, preferably acrylic acid.

In some embodiments, the second polymer comprises polymerized units of: one or more monoethylenically unsaturated C3-C6 carboxylic acid monomers, preferably acrylic acid; an ethylenically unsaturated sulfonic acid monomer, preferably 2-acrylamido-2-methyl propane sulfonic acid or 2-acrylamido-2-methylpropanesulfonic acid sodium salt; and optionally a further monomer, preferably selected from ethyl acrylate, butyl acrylamide, and maleic anhydride, more preferably ethyl acrylate.

In some embodiments, the second polymer comprises polymerized units of: 50 to 95 wt % of one or more monoethylenically unsaturated C3-C6 carboxylic acid monomers, preferably acrylic acid; 5 to 50 wt % of an ethylenically unsaturated sulfonic acid monomer, preferably 2-acrylamido-2-methyl propane sulfonic acid or 2-acrylamido-2-methylpropanesulfonic acid sodium salt; and 0 to 22 wt % of a further monomer, preferably selected from ethyl acrylate, butyl acrylamide, and maleic anhydride, more preferably ethyl acrylate.

In some embodiments, the second polymer is a mixture of polymers of the foregoing second polymers. In some embodiments, the second polymer is a mixture of (a) a homopolymer comprising polymerized units of a monoethylenically unsaturated C3-C6 carboxylic acid monomer; and (b) a polymer comprising polymerized units of: one or more monoethylenically unsaturated C3-C6 carboxylic acid monomers; an ethylenically unsaturated sulfonic acid monomer or salt thereof; and optionally a further monomer selected from ethyl acrylate, butyl acrylamide, and maleic anhydride.

The second polymer may be prepared by free-radical polymerization. A preferred method for preparing these polymers is by homogeneous polymerization in a solvent. The solvent may be water or an alcoholic solvent such as 2-propanol or 1,2-propanediol. The free-radical polymerization is initiated by the decomposition of precursor compounds such as alkali persulfates or organic peracids and peresters. The activation of these precursors may be by the action of elevated reaction temperature alone (thermal activation) or by the admixture of redox-active agents such as a combination of iron(II) sulfate and ascorbic acid (redox activation). In these cases, a chain-transfer agent is typically used to modulate polymer molecular weight. One class of preferred chain-transfer agents employed in solution polymerizations is the alkali or ammonium bisulfites. Specifically mentioned is sodium meta-bisulfite.

The second polymer may be end-capped with various groups, such as sulfonates or phosphonates.

One or more of the monomers from which the second polymer is comprised may be in free acid form, or they may be present in neutralized (salt) form.

In the polymer blend of the invention, the first polymer may comprise at least 1 wt %, alternatively at least 2 wt %, or alternatively at least 3 wt %, and up to 50 wt %, alternatively up to 30 wt %, alternatively up to 10 wt %, or alternatively up to 5 wt %, based on the total weight of the first polymer and the second polymer. The second polymer may comprise at least 50 wt %, alternatively at least 70 wt %, alternatively at least 90 wt %, or alternatively at least 95 wt %, and up to 99 wt %, alternatively up to 98 wt %, or alternatively up to 97 wt %, based on the total weight of the first polymer and the second polymer.

One or more of the first or second polymers of the polymer blend may be in at least partially neutralized (salt) form. Examples of suitable counterions for each neutralized polymer independently include, without limitation, sodium, potassium, or ammonium.

As indicated above, the invention also provides a process for making the polymer blend. The process comprises: (a) providing an aqueous solution of the one or more first polymers at pH 5 to 9; (b) providing an aqueous solution of the one or more second polymers at pH 5 to 12; (c) mixing together the solution of step (a) and the solution of step (b); and (d) drying the mixture prior to gross phase separation of the mixture.

Step (a) of the process of the invention involves providing an aqueous solution of the one or more first polymers at a certain pH. Since the first polymer generally contains acidic groups, the step of providing a certain pH typically involves at least partially neutralizing the first polymer (or mixtures of first polymers) to the desired pH. The pH may be at least pH 5, alternatively at least pH 6, or alternatively at least 6.5; and up to pH 9, alternatively up to pH 8, or alternatively up to 7.5. Preferably, the pH is 7.

The concentration of the first polymer in the solution is not critical and may range, for instance, from 10 to 60 weight percent, alternatively from 20 to 40 weight percent.

Step (b) of the process involves providing an aqueous solution of the one or more second polymers. Because the second polymer also contains acidic groups, the step typically involves at least partially neutralizing an aqueous solution of the second polymer (or mixture of polymers) to the specified pH. Thus, in this step, a solution of the second polymer is prepared at least pH 5, alternatively at least pH 6, or alternatively at least pH 6.5, and up to pH 12, alternatively up to pH 10, alternatively up to pH 8, or alternatively up to pH 7.5. In some embodiments, the pH may be 7. In some embodiments, it may be preferably to match the pH of the solution of the second polymer to that of the solution of the first polymer. For instance, it may be preferred to provide both solutions at a pH range of 6.5 to 7.5, alternatively a pH of 7. Such pH matching may prevent flocculation upon mixing and may increase overall compatibility of the polymers.

The concentration of the second polymer in the solution is not critical and may range, for instance, from 10 to 60 weight percent, alternatively 20 to 50 weight percent, or 30 to 50 weight percent.

The pH in steps (a) and (b) may be measured directly on the aqueous solution of the polymer that is to be used in subsequent steps; i.e., it is not necessary to dilute the solution for the purpose of measuring pH. Typically, the pH is measured at room temperature (e.g., between 18 and 25° C.). Neutralization may be accomplished by gradual addition of sodium hydroxide (e.g., 5-50 wt % aqueous sodium hydroxide) or other base to the first or second polymer solution, while preferably maintaining a temperature below 60° C. The polymer solutions may become highly viscous upon neutralization, and additional water may be added to lower the polymer concentration, as needed, to control viscosity.

Each of steps (a) and (b) may be carried out in any order (e.g., step (a) first, then step (b), or step (b) first then step (a)), or they be carried out concurrently.

In step (c), the solution of the at least partially neutralized first polymer of step (a) and the solution of the at least partially neutralized second polymer of step (b) are mixed together. This can be achieved, for instance, by adding one solution to the other, by adding the two solutions to another container, and/or by co-feeding the step (a) and step (b) solutions to equipment used in subsequent step(s). Mixing can be achieved by any technique that generally maintains the overall homogeneity of the liquid components of the mixture and includes, for instance, mixing using an overhead mixer, a magnetic stirbar, a flow through static mixing unit, or a flow through rotorstator mixer.

The mixture of step (c) is generally not physically stable and tends to phase separate within a short time (e.g., within 1 to 2 hours or sometimes on the order of minutes). Thus, step (d) of the invention, which comprises drying the mixture, is carried out prior to gross phase separation of the mixture. "Gross phase separation" as used herein means phase separation that results in formation of observable 0.5 mm or greater sized particles at a volume concentration in the solution of approximately 1 percent or more. Optionally, various practices may be used for delaying gross phase separation of the step (c) mixture including, for instance, through continued mixing.

Techniques that may be employed for the drying of step (d) include, but are not limited to, spray drying or fluid bed granulation. In a preferred embodiment, step (d) comprises spray drying of the mixture. In a typical spray drying process, the solutions of steps (a) and (b) may be co-fed to a holding tank and diluted, for instance to a concentration of about 25 to 35 wt %, to allow for spraying. The polymer blend may be heated, for instance to 50 to 60° C., and stirred to prevent phase separation. The diluted polymer blend may be fed to a fluid bed dryer with a spray nozzle set to an inlet temperature and feed rates that are readily determined by the operator. For example, a temperature of 130 to 170° C. at a feed rate of the solution of 400 to 450 g/min may be suitable.

As noted above, in a further aspect, the polymer blend granules of the invention may be utilized in detergent compositions, such as laundry detergent compositions or dishwashing detergent compositions. Within such compositions, the polymer blend may function as an effective dispersant and/or spotting reduction agent. Detergent compositions of the invention preferably comprise a builder, a surfactant, and the polymer blend. The amount of polymer blend (total amount of the first polymer(s) and the second polymer(s)) present in the detergent composition may typically range from 0.5 to 15 wt %, alternatively from 1 to 10 wt %, based on the total weight of the composition, although other amounts may be used and can be readily determined by the formulator.

The surfactant of the detergent composition may be anionic, cationic, or nonionic. For laundry detergents, anionic surfactants are preferred, for instance sulfonate based surfactants (e.g., sodium lauryl sulfate or sodium lauryl ether sulfate). Preferred surfactants for dishwashing detergents are nonionic surfactants, more preferably low foam nonionic surfactants. Exemplary nonionic surfactants include, without limitation, alkoxylate surfactants, particularly those based on ethylene oxide, propylene oxide, and/or butylene oxide. Examples include compounds having the formula RO-(M)x-(N)n-OH or R—O-(M)x-(N)y-O—R' in which M and N are units derived from alkylene oxides (of which one is ethylene oxide), x and y are integers from 0 to 20, provided at least one of them is not zero, R represents a C6-C22 linear or branched alkyl group, and R' represents a group derived from the reaction of an alcohol precursor with a C6-C22 linear or branched alkyl halide, epoxyalkane, or glycidyl ether. Other suitable nonionic surfactants include, without limitation, polyether polyols. The surfactant may be present in an amount of 0.1 to 15 wt %, alternatively 0.5 to 10 wt %, alternatively 1 to 6 wt %, based on a total weight of the dishwashing composition, although other amounts may be used and can be readily determined by the formulator.

The builder may be an inorganic builder such as sodium carbonate, or a biodegradable builder, and comprises a chelant, such as sodium citrate and/or citric acid. An aminocarboxylate, methylglycine diacetic acid (MGDA), glutamic acid diacetic acid (GLDA), and their sodium salts, and 2-hydroxyethyliminodiacetic acid disodium salt (HEIDA), may be included to provide a biodegradable chelant in the builder. The builder may be present in the detergent composition in an amount of 5 to 99 wt %, alternatively from 10 to 96 wt %, alternatively from 15 to 92 wt %, based on a total weight of the composition, although other amounts may be used and can be readily determined by the formulator.

Suitable water-soluble builder compounds include the water soluble monomeric carboxylates, or their acid forms. The builder may also comprise a fatty acid and/or optionally a salt thereof, specifically the sodium salt. Other builder/chelant compounds include nitrilotriacetic acid, N. N' ethylenediaminetetraacetic acid, diethylenetriaminepentaacetic acid, glycine-N,N-diacetic acid, methylglycine-N,N-diacetic acid, 2-hydroxyethyliminodiacetic acid, glutamic acid-N,N-diacetic acid, 3-hydroxy-2,2'-iminodisuccinate, N,N'-ethylenediaminedisuccinate aspartic acid-diacetic acid, N,N'-ethylenediamine disuccinic acid, iminodisuccinic acid, aspartic acid, aspartic acid-N,N-diacetate, beta-alaninediacetic acid, polyaspartic acid, a salt thereof, or a combination thereof. In some embodiments, the builder is sodium citrate, citric acid, or sodium carbonate, poly(itaconic acid), poly(aspartic acid), or a combination thereof.

The detergent composition may contain other optional components, for instance, one or more of: an alkaline source, a bleaching agent (e.g., sodium percarbonate, sodium perborate) and optionally a bleach activator (e.g., tetraacetylethylenediamine (TAED)) and/or a bleach catalyst (e.g., manganese(II) acetate, or cobalt(II) chloride); an enzyme (e.g., protease, amylase, lipase, or cellulase); foam suppressants; colors; fragrances; antibacterial agents and/or fillers. Fillers in tablets or powders are inert, water-soluble substances, typically sodium or potassium salts, e.g., sodium or potassium sulfate and/or chloride, and typically are present in amounts ranging from 0 wt % to 75 wt %. Fragrances, dyes, foam suppressants, enzymes and antibacterial agents usually total no more than 10 wt %, alternatively no more than 5 wt %, of the composition.

In a preferred embodiment, the detergent composition is phosphate-free. By "phosphate-free" is meant that the detergent composition is substantially free of phosphate-containing compounds, making the detergent composition more environmentally acceptable. Phosphate-free refers to a composition, mixture, or ingredients to which phosphate- and/or oligophosphate-containing compounds are not added. Should a phosphate-containing compound be present through contamination of a phosphate-free composition, mixture, or ingredient, the composition is encompassed by this embodiment of the invention, and the level of phosphate-containing compounds in the resulting cleaning composition is substantially phosphate-free, meaning less than about 0.5 wt %, less than about 0.1 wt %, or less than about 0.05 wt %, or less than about 0.01 wt %, based on a total weight of the detergent composition. In various embodiments, the detergent composition is free of phosphate-containing compounds, that is, no amount of phosphate compounds are detectable.

The detergent composition preferably has a pH (at 1 wt % in water) of at least 9, alternatively at least 10.5; and no greater than 12.5, alternatively no greater than 11.5.

The detergent composition may be used in an automatic washing machine, such as a laundry washing machine or a dishwashing machine. In practice, the composition may be formulated in any suitable form, such as a tablet, powder, monodose unit, multi-component monodose unit, sachet, paste, liquid, or gel. The components of the detergent composition may be located in distinct compartments, e.g., sealed in a pouch comprising a water-soluble polymer, so as to release at a selected point during the wash cycle, e.g., at a time different than release of the biodegradable filler, if present. The composition may be sealed in a multi-chamber pouch in which the content of each chamber is the same or different. For example, the fragrance may be disposed within a capsule to provide release during a selected cycle. With selection of an appropriate product form and addition time, the detergent composition may be present in the prewash, main wash, penultimate rinse, final rinse, or any combination of these cycles. The concentration of the detergent composition as a percentage of total liquid in the dishwasher may, for instance, be 0.1 to 1 wt %, alternatively from 0.2 to 0.7 wt %, although other amounts may be used and can be readily determined by the formulator.

The detergent composition may be formed by various methods. The detergent composition may be formed by contacting, e.g. mixing, all of the components together. The detergent composition is not limited to any particular method of manufacture.

The detergent composition may be used by contacting a surface to be washed with the composition.

Some embodiments of the invention will now be described in detail in the following Examples.

EXAMPLES

General.
Polymers.

Polymers used in the following examples are as follows:

Polymer 1A, representing the first polymer of the invention, is a copolymer based on 65 wt % methacrylic acid (MAA), 17.5 wt % ethyl acrylate (EA), and 17.5 wt % butyl acrylate (BA). The weight-average MW of this copolymer is approximately 50,000.

Polymer 1B, representing an alternate first polymer of the invention, is a copolymer based on 27 wt % methacrylic acid (MAA), 15% acrylic acid (AA) and 58 wt % ethyl acrylate (EA), The weight-average MW of this copolymer is approximately 50,000.

The following polymers represent the second polymer of the invention and are cumulatively referred to as Polymer 2.

Polymer 2A is a copolymer of acrylic acid (AA) and 2-acrylamido-2-methyl propane sulfonic acid (AMPS). The copolymer has a sulfonate endgroup and moderate MW.

Polymer 2B is a copolymer of AA, AMPS, and EA. The copolymer has a sulfonate endgroup and moderate MW.

Polymer 2C is a homopolymer of acrylic acid with a sulfonate endgroup and low MW.

Polymer 2D is a homopolymer of acrylic acid with a phosphonate endgroup and moderate weight average MW.
Polymer Molecular Weight.

Molecular weight is measured by gel permeation chromatograph (GPC) using known methodology, with the following typical parameters:

Analytical Parameters:
Instrument: Agilent 1100 HPLC system with isocratic pump, vacuum degasser, variable injection size autosampler, and column heater, or equivalent.
Detector: Agilent 1100 HPLC G1362A Refractive Index detector, or equivalent.
Software: Agilent ChemStation, version B.04.03 with Agilent GPC-Addon version B.01.01.
Column Set: TOSOH Bioscience TSKgel G2500PW×17.8 mm ID×30 cm, 7 μm column (P/N 08020) with TOSOH Bioscience TSKgel GMPW×17.8 mm ID×30 cm, 13 μm (P/N 08025).
Method Parameters:
Mobile Phase: 20 mM Phosphate buffer in MilliQ HPLC Water, pH~7.0.
Flow Rate: 1.0 ml/minute
Injection volume: 20 μL
Column temperature: 35° C.
Run time: 30 minutes Standards and Samples:

Standards: Polyacrylic acid, Na salts Mp 216 to Mp 1,100,000. Mp 900 to Mp 1,100,000 standards from American Polymer Standards.

Calibration: Polynomial fit using Agilent GPC-Addon software (Polynomial 4 used).

Injection concentration: 1-2 mg solids/mL 20 mM GPC mobile phase diluent. Used for both standards and samples.

Sample concentration: Typically, 10 mg sample into 5 mL 20 mM AQGPC mobile phase solution.

Flow Marker: 30 mM phosphate

Solutions Preparation:

Mobile Phase: Mobile Phase: Weigh out 14.52 g sodium phosphate monobasic ($NaH_2PO_4$) and 14.08 g sodium phosphate dibasic ($Na_2HPO_4$). Dissolve into 11 L MilliQ HPLC water, stir to fully dissolve all solids.

After they're dissolved and mixed in, adjusted the solution to pH 7 with 0.5 N sodium hydroxide. This solution is used for mobile phase and sample/standard preparation via a fixed volume repipetor.

Flow Marker: Mix, by weight, equal amounts of solid $Na_2HPO_4$ and $NaH_2PO_4$. Using the well-blended mix, weigh 1.3 grams and dissolve into 1 liter of the 20 mM AQGPC mobile phase mix.

Granulation.

A typical protocol for granulation in the Examples below is as follows.

Step 1. An aqueous solution of Polymer 1 (at about 25 to 30 wt % solids content) is neutralized with continuous mixing using aqueous NaOH (e.g., 5 to 50 wt % solution) to adjust the pH value to 7.

Step 2. An aqueous solution of Polymer(s) 2 (at about 38 to 42 wt % solids content) is neutralized with continuous mixing using aqueous NaOH (e.g., 5 to 50 wt % solution) to adjust the pH value to 7.

Step 3. The neutralized solution of Polymer 2 (or mixtures of Polymer 2) is emulsified with 188 g (28.90 g solid) of Polymer 1 (for instance at a solution ratio of about 10:1, or other ratio as appropriate, based on the concentration of the polymers in the solutions and the desired ratio in the final granule blend) and heated up to 55-56° C. The emulsion is diluted with water to about 30 wt % solids content, to facilitate sprayability. The pH value of the final emulsion is about 7. During the whole spray granulation process the emulsion is dispersed through a combination of mixing and heat to delay phase separation.

Step 4. The solution from Step 3 is spray dried using a Glatt lab scale fluid bed granulator model GPGC 3.1. Typical spray drying process parameters are as follows:

Inlet temp.: 130° C.

Inlet air flow: 50-65 m³/h

Outlet temp.: 60-65° C.

Product temp.: 70-75° C.

Nozzle/pressure/position: 2.0 mm/1.7-1.5 bar/DP3-4 (top)

Feed temperature: 55° C.

Solid content emulsion: 30%

Granules in the following Examples 1-4, prepared as described above, contain from about 3 to about 6 wt % of Polymer 1 and from about 94 to about 97 wt % of Polymer(s) 2 (e.g., Polymer 2A, plus Polymer 2B, etc).

Example 1

(Inventive)

A granular blend of Polymer 1A with Polymers 2A and 2C was prepared using substantially the same procedure as described above. Resultant granules are free-flowing, white, and exhibit a bulk density of 360 g/l with a low residual moisture content of 4-6%. Particle size distribution is as follows:

<200 μm—1.3%
200-1180 μm—98.7%
>1180 μm—0.0%

An optical microscope image of the blend, shown in FIG. 1, reveals that the material is granular, without dust or large agglomerates.

Example 2

(Inventive)

Figure 2:
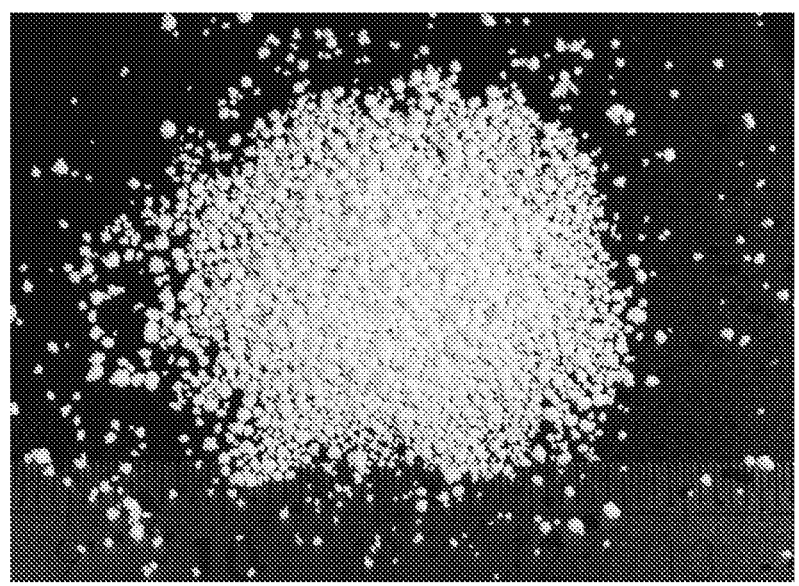

A granular blend of Polymer 1A with Polymers 2B and 2C was prepared using substantially the same procedure as described above. Resultant granules are analogous to Example 1 above. An optical microscope image of the blend, show in FIG. 2, reveals that the material is granular, without dust or large agglomerates.

Example 3

(Inventive)

Figure 3:

A granular blend of Polymer 1A with Polymers 2A and 2D was prepared using substantially the same procedure as described above. Resultant granules are analogous to Example 1. An optical microscope image of the blend, show in FIG. 3, reveals that the material is granular, without dust or large agglomerates.

Example 4

(Inventive)

Figure 4:
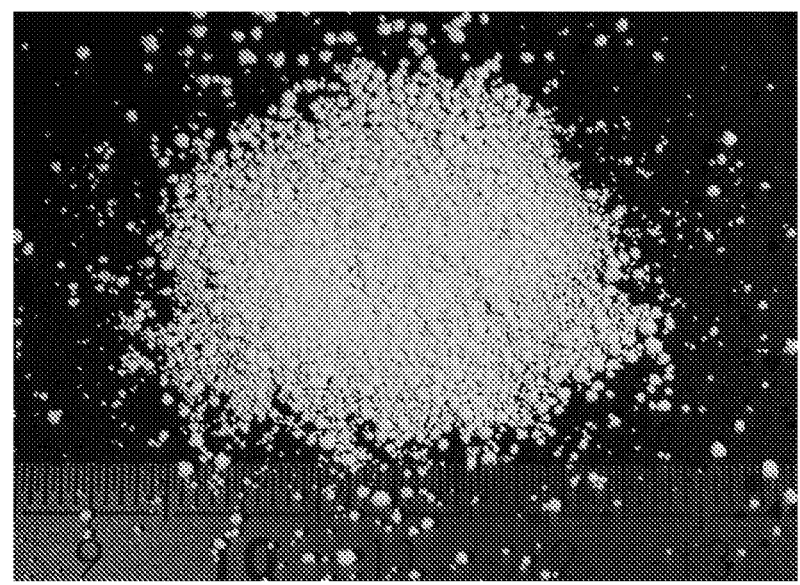

A granular blend of Polymer 1A with Polymers 2B and 2D was prepared using substantially the same procedure as described above. Resultant granules are analogous to Example 1 above. An optical microscope, show in FIG. 4, reveals that the material is granular, without dust or large agglomerates.

Example 5

(Comparative)

A liquid blend of Polymer 1B and Polymer 2A was prepared without the neutralization steps. Upon addition of Polymer 1B to a stirring solution of Polymer 2A, the mixture congealed and the resulting mixture could not be stirred.

The following prophetic Examples 6-9 are further illustrative of the invention, and may be prepared by those skilled in the art using the techniques described above.

Example 6

Blend of 1B with 2A and 2C

A granular blend of Polymer 1B with Polymers 2B and 2D may be prepared by using substantially the same procedures as described above. Resultant granules are expected to be analogous to Example 1 above.

Example 7

Blend of 1B with 2A

A granular blend of Polymer 1B with Polymers 2A may be prepared by using substantially the same procedures as described above. Resultant granules are expected to be analogous to Example 1 above.

Example 8

Blend of 1B with 2C

A granular blend of Polymer 1B with Polymers 2C may be prepared by using substantially the same procedures as described above. Resultant granules are expected to be analogous to Example 1 above.

Example 9

Blend of 1B with 2A, 2B, 2C

A granular blend of Polymer 1B with Polymers 2A, 2B and 2C may be prepared by using substantially the same procedures as described above. Resultant granules are expected to be analogous to Example 1 above.

What is claimed is:

1. A polymer blend comprising:
    (i) one or more first polymers each independently having a weight-average molecular weight of 35,000 to 100,000 g/mol and each independently comprising polymerized units of
        (a) 22 to 80 wt % of one or more monoethylenically unsaturated $C_3$-$C_6$ carboxylic acid monomers, and
        (b) 20 to 78 wt % of one or more $C_1$-$C_{12}$ alkyl (meth)acrylate monomers,
    wherein at least one of the one or more first polymer comprises polymerized units of:
        55 to 80 wt % of methacrylic acid units,
        10 to 35 wt % of ethyl acrylate units, and
        10 to 35 wt % of butyl acrylate units; and
    (ii) one or more second polymers each independently having a weight-average molecular weight of between 2,000 to 35,000 g/mol and each independently comprising polymerized units of 50 to 100 wt % of one or more monoethylenically unsaturated $C_3$-$C_6$ carboxylic acid monomers,
    wherein component (i) comprises from 1 wt % to 50 wt % based on the total weight of (i) and (ii), wherein the polymer blend is in granular form, and wherein one or more polymers of the polymer blend is at least partially neutralized.

2. The polymer blend of claim 1, made by a process comprising:
    (a) providing an aqueous solution of the one or more first polymers at pH 5 to 9;
    (b) providing an aqueous solution of the one or more second polymers at pH 5 to 12;
    (c) mixing together the solution of step (a) and the solution of step (b); and
    (d) drying the mixture prior to gross phase separation of the mixture.

3. A process for making the polymer blend of claim 1, the process comprising:
    (a) providing an aqueous solution of the one or more first polymers at pH 5 to 9;
    (b) providing an aqueous solution of the one or more second polymers at pH 5 to 12;
    (c) mixing together the solution of step (a) and the solution of step (b); and
    (d) drying the mixture prior to gross phase separation of the mixture.

4. The polymer blend of claim 1, wherein at least one of the one or more first polymers is a product of free-radical emulsion polymerization in the presence of a $C_2$-$C_{24}$ alkanethiol.

5. The polymer blend of claim 1, wherein at least one of the one or more second polymers is a homopolymer comprising polymerized units of a monoethylenically unsaturated $C_3$-$C_6$ carboxylic acid monomer.

6. The polymer blend of claim 1, wherein the one or more second polymers is a mixture of (a) a homopolymer comprising polymerized units of a monoethylenically unsaturated $C_3$-$C_6$ carboxylic acid monomer; and (b) a polymer comprising polymerized units of: one or more monoethylenically unsaturated $C_3$-$C_6$ carboxylic acid monomers; an ethylenically unsaturated sulfonic acid monomer; and optionally a further monomer selected from ethyl acrylate, butyl acrylamide, and maleic anhydride.

7. A detergent composition comprising: a surfactant, a builder, and the polymer blend of claim 1.

* * * * *